Figure 1:
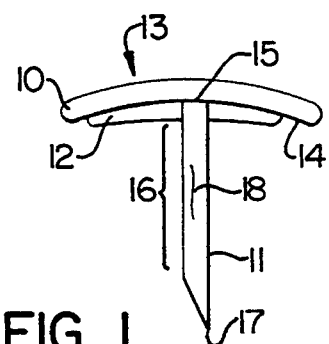
Figure 2:
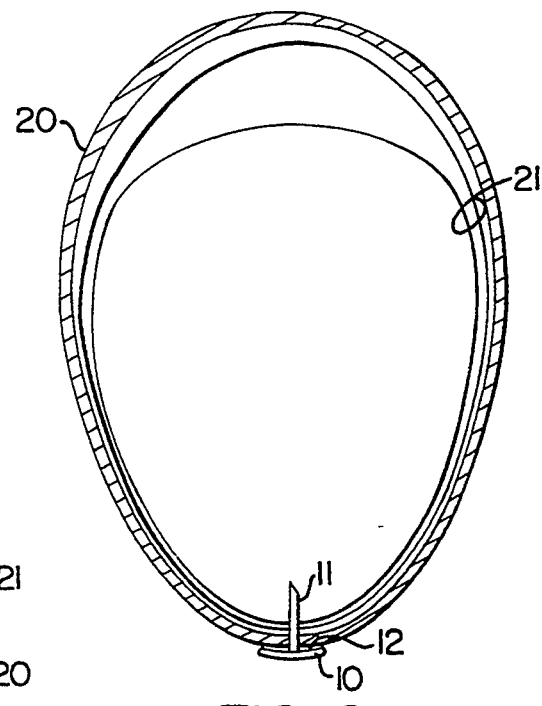
Figure 2A:
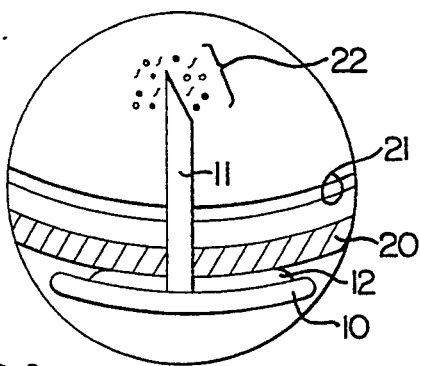

United States Patent

Phelps et al.

[11] Patent Number: 5,438,954
[45] Date of Patent: Aug. 8, 1995

[54] METHOD AND APPARATUS FOR EARLY EMBRYONIC IN OVO INJECTION

[75] Inventors: Patricia V. Phelps, Raleigh; Richard P. Gildersleeve, Cary, both of N.C.

[73] Assignee: Embrex, Inc., Research Triangle Park, N.C.

[21] Appl. No.: 146,977

[22] Filed: Nov. 3, 1993

[51] Int. Cl.⁶ .............................................. A01K 45/00
[52] U.S. Cl. ........................................ 119/6.8; 119/35; 119/45.2
[58] Field of Search ............... 119/6.8, 35, 6.6, 45.2, 119/50.7; 435/284, 292; 604/46, 47, 180, 57, 265, 60, 288, 167; 47/15, 48.5 G, 48.5, 48.5 R, 57.5

[56] References Cited

U.S. PATENT DOCUMENTS

| | | |
|---|---|---|
| 1,756,453 | 4/1930 | Davey et al. ............... 47/57.5 |
| 2,477,752 | 8/1949 | Kiss . |
| 2,734,482 | 2/1956 | Seltzer . |
| 3,136,314 | 6/1964 | Kravitz ..................... 604/46 |
| 3,256,856 | 6/1966 | Nicely et al. . |
| 3,377,989 | 4/1968 | Sandhage et al. . |
| 4,040,388 | 8/1977 | Miller . |
| 4,593,646 | 6/1986 | Miller et al. . |
| 4,681,063 | 7/1987 | Hebrank . |
| 4,755,173 | 7/1988 | Konopka et al. ............ 604/180 |
| 4,903,635 | 2/1990 | Hebrank . |
| 4,928,628 | 5/1990 | Gassman et al. . |
| 4,928,629 | 5/1990 | Trampel . |
| 4,966,159 | 10/1990 | Maganias ................... 604/46 |
| 5,056,464 | 10/1991 | Lewis . |
| 5,136,979 | 8/1992 | Paul et al. . |
| 5,176,101 | 6/1993 | Paul et al. . |
| 5,176,648 | 1/1993 | Holmes et al. ............. 604/180 |

Primary Examiner—Todd E. Manahan
Attorney, Agent, or Firm—Bell, Seltzer, Park & Gibson

[57] ABSTRACT

An apparatus for administering compounds to avian eggs through the shell thereof comprises a blocking member, an elongate shaft connected to the blocking member, an active agent depot connected to the elongate shaft, and an adhesive seal connected to the blocking member for sealably connecting the blocking member to the egg shell with the shaft penetrating through the shell. Methods of using the apparatus of the present invention are also described.

32 Claims, 2 Drawing Sheets

METHOD AND APPARATUS FOR EARLY EMBRYONIC IN OVO INJECTION

FIELD OF THE INVENTION

The present invention relates to the administration of compounds to avian eggs, and in particular relates to an improved method and apparatus for early embryonic in ovo administration.

BACKGROUND OF THE INVENTION

Advances in poultry embryology have made possible the addition of various substances to the embryo or to the environment around the embryo within an avian egg for the purpose of encouraging beneficial effects in the subsequently hatched chick. Such beneficial effects include increased growth, prevention of disease, increasing the percentage hatch of multiple incubated eggs, and otherwise improving physical characteristics of hatched poultry. Additionally, certain types of vaccinations which could previously only be carried out upon either recently hatched or fully mature poultry can now be successful in the embryonated chick. In ovo administration techniques that replace the injection of very young hatched chicks can increase the efficiency of administration and reduce the stress on young chicks caused by injection.

Many methods of adding compounds to avian eggs utilize the injection of fluids by syringe. One traditional method has been syringe injection of eggs by hand. A number of automatic egg injection devices have also been developed. These include U.S. Pat. Nos. 5,056,464 to Lewis; 4,903,635 and 4,681,063 to Hebrank; 3,377,989 to Sandhage; and 4,040,388, 4,469,047, and 4,593,646 to Miller. A review of all these patents and their associated systems reveals, however, that all require that fluid be delivered from a storage device to the egg through a system of pumps and tubing which carries the fluid to the syringe needle.

Several injection devices seal the injection site after injection to prevent leakage and contamination. U.S. Pat. No. 4,040,388 to Miller describes heating the portion of the injection device which punctures the egg, allegedly sterilizing the exterior of the egg and also sealing the hole by heat coagulating a small portion of the egg albumin. U.S. Pat. No. 4,593,646 to Miller et al. discloses sealing of eggs after injection by heating and coagulating the albumin located near the injection site. An additional sealant is then applied to the outer shell by dipping each egg in a bath of sealant. U.S. Pat. No. 2,477,752 to Kiss discloses a method of injecting fertile eggs for the purpose of producing chicks have colored down. The '752 patent describes manual injection of the egg and subsequent sealing of the injection site.

Methods other than syringe injection to add compounds to eggs have been disclosed. U.S. Pat. No. 3,256,856 to Nicely discloses puncturing the egg shell over the air cell, applying negative pressure to draw air from the air cell, and then immersing the egg in a bath of liquid treatment material and returning to atmospheric pressure to draw treatment fluid into the egg. Treatment substances have also been administered by creating a pressure gradient across the shell or by immersion in a treatment bath. See also U.S. Pat. No. 4,928,628 to Gassman, 4,928,629 to Trampel, and 2,734,482 to Seltzer. These techniques are generally cumbersome and difficult to apply on a commercial scale.

For some applications it would be desirable to have a means for delivering substances into an egg other than by automated syringe injection. Other than hand injection with a syringe, however, few such techniques are available.

In view of the foregoing, an object of the present invention is to provide methods and apparatuses for in ovo injection in which injection and sealing of the injection site is accomplished in one step.

SUMMARY OF THE INVENTION

A first aspect of the present invention is an apparatus for administering an active agent to a bird egg, comprising a blocking member connected to an elongate shaft, an active agent depot connected to the elongate shaft, and seal means connected to the inner surface of the blocking member for sealably connecting the blocking member to the egg shell.

A further aspect of the present invention is an apparatus for administering an active agent to a bird egg, comprising a blocking member connected to an elongate hollow shaft, a septum transversely positioned within the elongate hollow shaft, and seal means connected to the inner surface of the blocking member for sealably connecting the blocking member to the egg shell. An active agent depot may be carried within the lumen of the hollow shaft, or delivered through the hollow shaft.

A further aspect of the present invention is a method for administering an active agent to a bird egg through the egg shell, comprising the steps of providing an injection apparatus (comprising a blocking member connected to an elongate shaft, an active agent depot connected to the elongate shaft, and seal means connected to the inner surface of the blocking member for sealably connecting the blocking member to the egg shell) and inserting the elongate shaft through the egg shell and into the egg interior, so that the blocking member is sealably connected to the shell and so that the active agent is placed within the interior of the egg.

A further aspect of the present invention is a method for administering an active agent to a bird egg through the egg shell, comprising the steps of providing an injection apparatus (comprising a blocking member connected to an elongate hollow shaft, a penetrable septum transversely positioned within the elongate hollow shaft, seal means connected to the inner surface of the blocking member for sealably connecting the blocking member to the egg shell, and delivery means for delivering an active agent to the interior of the egg, the delivery means having an active agent depot and being capable of penetrating the septum) and inserting the elongate shaft of the injection apparatus into the interior of the egg so that the blocking member is sealably connected to the shell, and then penetrating the septum with the delivery means to deliver the active agent into the egg.

A further aspect of the present invention is a method for administering an active agent to a bird egg through the shell, comprising providing an injection apparatus (comprising a blocking member connected to an elongate hollow shaft, a septum slidably related to the hollow shaft and positioned transversely within the hollow shaft to create proximal and distal compartments within the shaft, seal means connected to the inner surface of the blocking member for sealably connecting the blocking member to the egg shell, delivery means for delivering an active agent to the interior of the egg, the delivery means capable of penetrating the septum, and an active agent depot placed within the proximal compartment of the hollow shaft) and inserting the elongate shaft of the injection apparatus into the egg so that the blocking member is sealably connected to the shell, and then forcing the septum and active agent into the interior of the egg using the delivery means.

The foregoing and other objects and aspects of the present invention are explained in detail in the specification set forth below.

BRIEF DESCRIPTION OF THE DRAWINGS

FIG. 1 is a cross-sectional view of an embodiment of the injection apparatus of the present invention, showing the elongate shaft designed to penetrate the shell of eggs, and the blocking member with sealant thereon.

FIG. 2 is a cross-sectional view of an avian egg with the injection apparatus of FIG. 1 inserted through the egg shell and inner egg membranes and into the albumin of the egg.

FIG. 2A shows the blocking member seated against the egg shell and held in place by sealant, with the elongate shaft of the injection apparatus penetrating into the albumin.

FIG. 3 is a cross-sectional view of an egg and an embodiment of the injection apparatus of the present invention. The shaft of the injection apparatus has a lumen formed therein, in which the active agent depot is contained. The active agent is separated from the egg contents by a septum made of degradable polymer.

FIG. 4 is a cross-sectional view of an egg and an embodiment of the injection apparatus of the present invention. The shaft of this injection apparatus has a lumen formed therein, and the lumen is separated into two compartments by a penetrable, self-sealing septum. A delivery device contains the active agent depot.

FIG. 5 is a cross-sectional view of an egg and an embodiment of the injection apparatus of the present invention. The shaft of the injection apparatus has a lumen formed therein which contains the active agent depot. The active agent depot is separated from the egg interior by a non-degradable, slidable septum. In use, a stylet is inserted in the lumen of the shaft to force the active agent into the egg.

FIG. 6 shows an embodiment of the injection apparatus of the present invention having a blocking member with a dome-shaped exterior surface and a concave interior surface, and having a graspable handle attached to the blocking member.

DETAILED DESCRIPTION OF THE PREFERRED EMBODIMENTS

The apparatus of the present invention comprises, in general, an elongate shaft designed to penetrate the shell and inner membranes of an avian egg, a blocking member, sealant, and an active agent depot such as a reservoir of active agent deposited in a lumen or opening in the shaft, an agent deposited in a solid biodegradable polymer which is carried by or adhered to the shaft, or simply by fixing the active agent directly to the shaft. As used herein, the term "active agent depot" refers to a quantity of active agent sufficient to achieve the desired physiological or biological effect in the bird, either alone or in combination with a carrier (e.g., a degradable polymer or other pharmaceutically acceptable excipient).

A preferred embodiment of the present invention is shown in FIGS. 1 & 2. The injection apparatus comprises a disc-shaped blocking member (10) having an outer surface (13) and a concave inner surface (14), and an elongate shaft (11) having a proximal end (15), an intermediate portion (16), and a distal end (17). The elongate shaft is connected at its proximal end to the concave inner surface of the blocking member; the distal end may be tapered, planar or concave. The elongate shaft is of a length sufficient to extend, when the concave inner surface of the blocking member is seated against the exterior of an egg, into the compartment of the egg into which active agent deposition is desired. Sealant (12) is carried on the concave inner surface of the blocking member and completely surrounds the elongate shaft at the point it connects to the blocking member. The active agent depot (18), in this embodiment, is carried on the surface of the elongate shaft.

In use (FIG. 2) the elongate shaft (11) of the injection apparatus is inserted through the shell (20) and the inner membranes (21) of an avian egg, so that the shaft (11) extends into the compartment of the egg into which active agent deposition is desired (as shown in FIG. 2, the shaft extends into the albumin). As shown in FIG. 2A, the blocking member (10) is seated firmly against the exterior of the egg shell, and the sealant (12) both adhesively bonds the blocking member to the egg shell and seals the opening formed in the shell by the shaft. The active agent (22) is deposited into the interior of the egg.

The active agent depot may be contained on the surface of the shaft, which may have ridges, pores, depressions or other surface irregularities formed therein to facilitate carrying the active agent. Alternatively, the elongate shaft may have a lumen formed therein and be open at the distal end, and carry the active agent within the lumen. Alternatively, the shaft may be made of a composite material consisting of the active agent to be delivered combined with a material which degrades while in the inner egg environment to release the active agent. In another embodiment of the present invention, a hollow elongate shaft extends through the blocking member, the shaft having a lumen formed therein and being open at both the proximal and distal ends. At the time active agent delivery is desired, the active agent depot is delivered to the interior of the egg through the lumen of the hollow shaft.

The blocking member performs two functions: (1) limit the depth to which the shaft penetrates the egg, and (2) carry sealant in an amount and a position such that the opening created in the egg shell by the shaft is sealed when the blocking member is bonded to the egg by the sealant. Use of a sealant prevents the leakage of egg components and the ingress of contaminants and air into the egg.

Suitable seal means for use in the present invention are those materials capable of adhesively bonding the egg shell to the blocking member, so that the combination of the blocking member and the seal means isolates the interior of the egg from the external environment and essentially prevents leakage of egg contents and entry of air into the egg. Examples of suitable seal means include sealants or adhesives, including but not limited to, silicone sealants (e.g., G.E. TM Silicon II), mucilage adhesives (e.g., Carter's Mucilage TM, Carters Ink Co., Waltham, Mass.), glues, hot-melt adhesives, and other essentially nontoxic glues, sealants and adhesives. Sealant is deposited on the blocking member in an amount sufficient to bond the blocking member to the egg shell and to seal the injection site in the egg shell.

Figure 3:
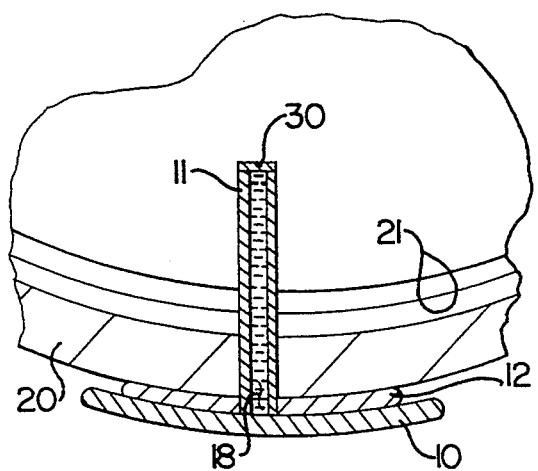

In an embodiment of the apparatus as shown in FIG. 3, the elongate shaft (11) has a lumen formed within it, but the elongate shaft does not extend through the blocking member (10). The active agent depot (18) is contained within the lumen of the hollow shaft and is separated from the egg contents by a septum (30) made of a biodegradable material. In use the injection apparatus is inserted into the egg, as above. Upon degradation of the septum, the active agent is released into the egg. Alternatively, the entire lumen of the elongate shaft may be filled with degradable polymer into which the active agent is mixed. The active agent is released over time as the polymer degrades.

In another embodiment of the present invention, the elongate shaft of the injection apparatus is made entirely or partially of degradable polymer in which the active agent to be delivered is contained. The active agent is released over time as the polymer of the shaft degrades. In another embodiment of the present invention, the elongate shaft contains inserts of biodegradable polymer in which the active agent to be delivered is contained. Such polymer inserts may be of any configuration which does not substantially affect the ability of the shaft to penetrate and be inserted into the egg. Such inserts may, for example, be configured as a layer of polymer which surrounds the shaft or as small particles adhered to the shaft.

Figure 4:
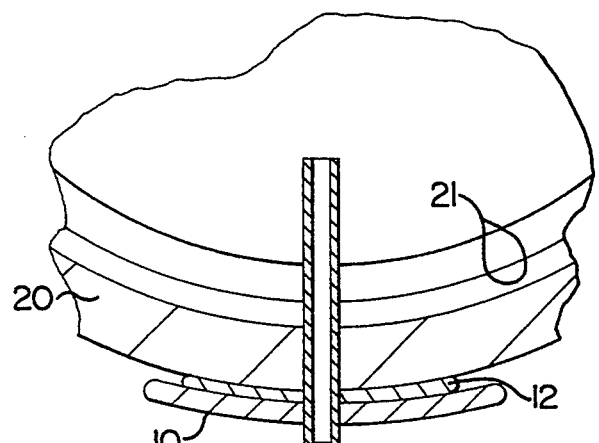
Figure 4:
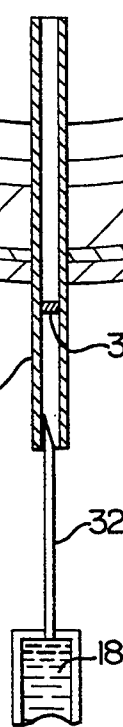

In an embodiment of the apparatus as shown in FIG. 4, the elongate shaft (11) of the injection apparatus extends through the blocking member (10) and has a lumen formed throughout its length. A penetrable, self-sealing septum (31) is contained within, and blocks, the lumen. In use the distal end (17) of the shaft is inserted into an egg through the shell (20) and inner egg membranes (21) until the blocking member (10) is seated against and bonded to the egg shell. A syringe and hollow needle (32) provide a delivery means for delivering the active agent to the interior of the egg. The delivery means contains the active agent depot (18), and is inserted into the shaft (11) to pierce the septum (31) and deliver the active agent to the interior of the egg through the shaft (11). The syringe (32) is then withdrawn from the shaft (11). Materials which may be used to form a penetrable self-sealing septum include SILASTIC TM adhesive, silicone sealant, or rubber. Many suitable delivery means may be employed, including but not limited to hypodermic injection syringes and needles, eye droppers, pipettes, and bulb syringes.

Figure 5:
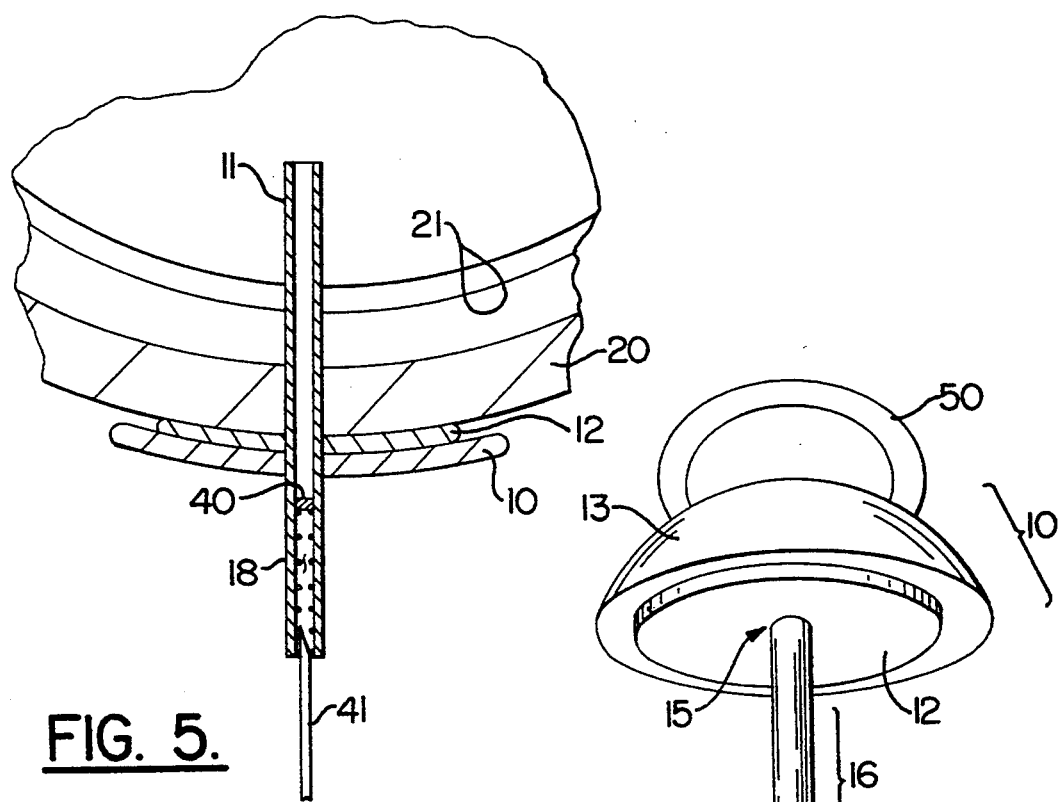

In an alternative embodiment of the injection apparatus as shown in FIG. 5, the elongate shaft (11) of the injection apparatus extends through the blocking member (10) and has a lumen formed throughout its length. The lumen is blocked by a septum (40) which is slidably related to the inner walls of the hollow shaft. The active agent depot (18) is carried within the lumen, such that when the shaft is inserted into an egg, the active agent depot is separated from the egg contents by the septum. In use, once the shaft is inserted in an egg, a stylet (41) is inserted into the shaft (11) and is used to push the active agent and slidable septum into the egg interior. The stylet is of a length and configuration sufficient to expel the active agent into the egg interior, and to essentially block the lumen of the hollow shaft, when inserted therein; the stylet is left within the lumen during any subsequent egg incubation.

Figure 6:
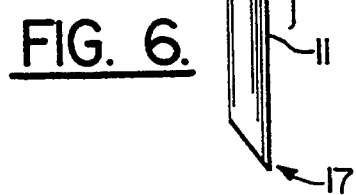

The blocking member of the injection apparatus may be modified to include labels or markable surfaces, or may be color-coded or otherwise identified. The blocking member may also be adapted for use as a handle or otherwise used as a means to move the egg to which it is attached (e.g., by attaching a graspable handle to the blocking member). FIG. 6 shows an embodiment of the injection apparatus having a handle (50) attached to the outer surface (13) of the blocking member (10), and having an elongate shaft (11) with a blunt distal end (17). The sealant (12) completely surrounds the proximal end (15) of the elongate shaft.

The term "birds" as used herein, is intended to include males or females of any avian species, but is primarily intended to encompass poultry which are commercially raised for eggs or meat. Accordingly, the term "bird" is particularly intended to encompass hens, cocks and drakes of chickens, turkeys, ducks, geese, quail, ostrich and pheasant. Chickens and turkeys are preferred, with chickens most preferred.

The term "in ovo," as used herein, refers to birds contained within an egg prior to hatch. Thus, the present invention may be conceived of as both an apparatus for, and a method of administering a compound to, an egg as well as an apparatus for, and a method of administering a compound to, a bird. The present invention may be practiced with any type of bird egg, including chicken, turkey, duck, goose, quail, ostrich and pheasant eggs. Chicken and turkey eggs are preferred, with chicken eggs most preferred. Eggs treated by the method of the present invention are fertile eggs which may be in any period of incubation, from early to late, but are preferably in the first half of incubation. Eggs may be treated prior to incubation (i.e., Day 0 of incubation). Eggs may be incubated to hatch following treatment.

The active agent is, in general, an organic compound which produces a biological, physiological, and/or immunological effect in the bird, such as an antibiotic, vitamin, vaccine, hormone, enzyme inhibitor, peptide, protein, cell or DNA.

The method and apparatus of the present invention may be utilized to inject substances into the amniotic fluid, allantois, albumin, or aircell of the egg. The injection site will vary depending upon the active agent to be injected and the effect desired; one skilled in the art will be able to readily select an appropriate injection site.

Septums may be formed of any essentially nontoxic material having suitable physical properties. Examples of materials suitable for self-sealing penetrable septums include rubber, SILASTIC TM adhesive, and silicone sealants (e.g., G.E. TM Silicon II).

Erodible or biodegradable polymers useful in practicing the present invention include polylactide polymers, polylactic polyglycolic acid copolymers, erodible hydroxypropylmethyl cellulose, and methacylate polymers. A depot amount of an active compound can be incorporated into the polymer to allow delivery of the compound as the polymer erodes. Such polymers, and their use, are disclosed in U.S. Pat. No. 3,773,919, at column 2, lines 1–4, and column 7, line 12, et seq (the disclosure of which is intended to be incorporated in its entirety herein). The term "polylactide," as used herein, includes both the generic meaning of a polyester derived from an alpha-hydrocarboxylic acid, and the specific meaning for the polymer derived from lactic acid (alpha-hydroxypropionic acid). Thus the term polylactide, when herein used generically, encompasses lactide/glycolide copolymers. Particularly preferred polylactide polymers are polymers formed of polylactide or polyglycolide, and particularly copolymers thereof. Properties of these polymers, and methods of making them, are discussed in D. L. Wise, et al., Lactic/-Glycolic Acid Polymers, in *Drug Carriers in Biology and Medicine*, Chapter 12 (G. Gregoriadis, Ed. 1979), and in T. R. Tice and D. R. Cowsar, Biodegradable Controlled-Release Parenteral Systems, *Pharmaceutical Technology*, page 26 (November 1984).

Polylactides having a high molecular weight (greater than 10,000 daltons) can form films, and are therefore preferred for practicing the present invention. The specific lactide used, in a poly(lactide-coglycolide) copolymer or otherwise, can be poly(D-lactide), poly(L-lactide), or racemic poly(D,L-lactide). Generally preferred for drug delivery systems are poly (L-lactide) and poly (D,L-lactide). Best results with these copolymers are obtained with copolymers ranging in molar composition form about 15 to 85 percent poly(glycolide), with the remainder poly(lactide). The rate of copolymer biodegradation is adjusted by altering the lactide/glycolide ratio, as is known in the art.

The biodegradable polymer having the active compound therein may be in any physical form suitable for deposition within an egg. Preferably the polymer serves as a matrix in which the active compound is distributed. Use of various shapes and compositions of these polymers in controlled-release drug delivery systems is discussed in Wise, et al,, supra, and T. R. Tice and D. R. Cowsar, supra.

The following examples are provided to illustrate the present invention, and should not be construed as limiting thereof.

EXAMPLE 1

Injection of Agent into Albumin of Egg

The injection apparatus used in this example comprised a stainless steel tack having a pointed shaft 5/16 inch in length and 1/16 inch in diameter, and a slightly concave discoid head ⅜ inch in diameter (Moore Solidhead Steel, No. 51, #2, Wyndmoor, Pa.). The shaft of each tack used was coated with a mixture of mucilage (Carters Ink Co., Waltham, Mass.), the antibiotic GARASOL TM (Schering Corp., Kenilworth, N.J.) and green vegetable food dye. The underside of the tack head (concave side from which the shaft extended) was coated with a thin layer of silicone sealant (G.E. TM Silicone II).

Six fresh, non-incubated eggs were used. Each egg was held upright (large end up) while a tack was inserted upwardly into the small end of the egg. Tacks were inserted until the tack head was seated firmly against the egg shell and bonded to the egg shell by the sealant. After 24 hours the eggs were broken open and the albumin visually inspected. The presence of green colored albumin indicated the deposition of dye and antibiotic into the albumin, and the dispersion of dye and antibiotic through the albumin.

EXAMPLE 2

Hatchability: Injection without Sealant

The hatchability of non-injected eggs was compared to eggs injected using a stainless steel tack having a pointed shaft 5/16 inch in length and 1/16 inch in diameter, and a slightly concave discoid head ⅜ inch in diameter (Moore Solidhead Steel, No. 51, #2, Wyndmoor, Pa.). No sealant was used. Fresh, non-incubated eggs were used; control eggs (n=127) were not injected. Injected eggs (n=132) were held upright (large end up) while a tack was inserted upwardly into the small end of the egg. Tacks were inserted until the tack head was placed against the egg shell. Injected and control eggs were then incubated to hatch.

Hatchability of control eggs was 72.2%; hatchability of injected eggs was 56%. These results indicate that the hatchability of eggs injected without the use of sealant is significantly reduced over non-injected controls.

EXAMPLE 3

Hatchability: Injection With Sealant

The hatchability of non-injected eggs was compared to eggs injected using a stainless steel tack having a pointed shaft 5/16 inch in length and 1/16 inch in diameter, and a slightly concave discoid head ⅜ inch in diameter (Moore Solidhead Steel, No. 51, #2, Wyndmoor, Pa.). Fresh, non-incubated eggs were used. Control eggs (n=56) were not injected. Injected eggs were held upright (large end up) while a tack was inserted upwardly into the small end of the egg. Tacks were inserted until the tack head was placed against the egg shell. Fifty-six eggs were injected without the use of a sealant. Fifty-six eggs were injected using tacks with the underside of the tack head (concave side from which the shaft extended) coated with a thin layer of DUCO TM cement (E.I. DuPont). All eggs were then incubated to hatch under similar conditions.

Hatchability of control eggs was 77.8%; hatchability of injected eggs (no sealant) was 60.5%; hatchability of injected (and sealed) eggs was 68.5%. These results indicate that the presence of sealant on the injection apparatus increases hatchability of injected eggs.

The foregoing is illustrative of the present invention and is not to be construed as limiting thereof. The invention is defined by the following claims, with equivalents of the claims to be included therein.

That which is claimed is:

1. An apparatus for administering an active agent to the interior of a bird egg through the shell thereof, comprising:
   a blocking member having an outer surface and an inner surface formed thereon;
   an elongate shaft having a distal end, an intermediate portion, and a proximal end, with said proximal end connected to said inner surface of said blocking member;
   an active agent depot containing an active agent connected to said elongate shaft, wherein said active agent depot is contained within a cavity formed in the surface of said elongate shaft; and
   seal means connected to said inner surface of said blocking member for sealably bonding said blocking member to the shell of a bird egg with said shaft penetrating through the shell, wherein said seal means comprises a layer of adhesive.

2. The apparatus of claim 1, wherein said active agent depot is contained on said distal end of said elongate shaft.

3. The apparatus of claim 1, wherein said active agent depot is contained on said intermediate portion of said elongate shaft.

4. The apparatus of claim 1, wherein said elongate shaft has a lumen formed therein.

5. The apparatus of claim 4, wherein said active agent depot is carried within said elongate shaft.

6. The apparatus of claim 1 wherein said elongate shaft comprises a biodegradable polymer.

7. The apparatus of claim 1, wherein said seal means surrounds said elongate shaft.

8. The apparatus of claim 1, wherein said inner surface of said blocking member is concave.

9. An apparatus for administering an active agent to the interior of a bird egg through the shell thereof, comprising:
   a blocking member having an outer surface and an inner surface formed thereon;
   an elongate shaft having a distal end, an intermediate portion, and a proximal end, with said proximal end connected to said inner surface of said blocking member, said elongate shaft comprising a biodegradable polymer and an active agenil and
   seal means connected to said inner surface of said blocking member for sealably bonding said blocking member to the shell of a bird egg with said shaft penetrating through the shell, wherein said seal means comprises a layer of adhesive.

10. An apparatus for administering an active agent to the interior of a bird egg through the shell thereof, comprising:
    a blocking member having an outer surface and an inner surface formed thereon;
    an elongate hollow rigid shaft having a lumen formed therethrough and having a distal end, an intermediate portion, and a proximal end, with said proximal end extending through said blocking member;
    a septum transversely positioned within said elongate hollow rigid shaft;
    seal means connected to said inner surface of said blocking member for sealably bonding said blocking member to the shell of a bird egg with said rigid shaft penetrating through the shell, wherein said seal means comprises a layer of adhesive.

11. The apparatus of claim 10, wherein said septum is a penetrable septum, and further comprising:
    delivery means for delivering an active agent to the interior of the egg, said delivery means comprising an active agent depot containing an active agent and means for penetrating said penetrable septum.

12. The apparatus of claim 10 wherein said septum is slidably related to said hollow rigid shaft and is placed within said intermediate portion of said hollow rigid shaft to divide said shaft into proximal and distal compartments, said apparatus further comprising:
    an active agent depot containing an active agent placed within said proximal compartment of said hollow rigid shaft.

13. The apparatus of claim 12 further comprising a styler, said styler configured in length and shape such that it can be slidably introduced into said hollow rigid shaft to deliver said active agent to the interior of the egg.

14. The apparatus of claim 10, wherein said seal means surrounds said elongate rigid shaft.

15. The apparatus of claim 10, wherein said inner surface of said blocking member is concave.

16. A method for administering an active agent to the interior of a bird egg through the shell thereof, comprising the steps of:
    (a) providing an injection apparatus comprising:
    a blocking member having an outer surface and an inner surface formed thereon;
    an elongate rigid shaft having a distal end, an intermediate portion, and a proximal end, with said proximal end connected to said inner surface of said blocking member;
    an active agent depot containing an active agent connected to said elongate rigid shaft; and
    seal means connected to said inner surface of said blocking member for sealably bonding said blocking member to the shell of a bird egg with said rigid shalt penetrating through the shell; and
    (b) inserting said elongate rigid shaft of said injection apparatus into the egg so that said elongate rigid shaft extends through the shell and said blocking member is sealably connected to the shell;
    whereby said active agent depot is placed within the interior of the egg and said active agent is dispensed thereto.

17. A method according to claim 16, further comprising the step of incubating said egg to hatch with said delivery device sealably bonded thereto.

18. A method according to claim 16, wherein said egg is selected from the group consisting of chicken, turkey, duck, geese, quail, ostrich, and pheasant eggs.

19. A method according to claim 16, wherein said active agent is administered to said egg during about the first half of in ovo incubation.

20. A method according to claim 16, wherein said egg is a chicken egg and said compound is administered to said egg on about day 0 to about day 15 of incubation.

21. A method according to claim 16, wherein said egg is a chicken egg and said compound is administered to said egg on about day 0 to about day 11 of incubation.

22. A method according to claim 16, wherein said active agent depot is deposited into said egg in the region defined by the albumin.

23. A method according to claim 16, wherein said active agent depot contains an active agent selected from the group consisting of antibiotics, vitamins, vaccines, hormones, enzyme inhibitors, peptides, cells and DNA.

24. A method for administering an active agent to the interior of a bird egg through the shell thereof, comprising the steps of:
    (a) providing an injection apparatus comprising:
    a blocking member having an outer surface and an inner surface formed thereon;
    an elongate hollow rigid shaft having a lumen formed therethrough and having a distal end, an intermediate portion, and a proximal end, with said proximal end extending through said blocking member;
    a penetrable septum transversely positioned within said elongate hollow rigid shaft;
    seal means connected to said inner surface of said blocking member for sealably bonding said blocking member to the shell of a bird egg with said rigid shaft penetrating through the shell;
    delivery means for delivering an active agent to the interior of the egg, said delivery means comprising an active agent depot containing an active agent and means for penetrating said penetrable septum; and
    (b) inserting said elongate rigid shaft of said injection apparatus into the egg so that said elongate rigid shaft extends through the shell and said blocking member is sealably connected to the shell; and
    (c) penetrating said penetrable septum with said delivery means and delivering said active agent depot into the interior of the egg and said active agent is dispensed thereto.

25. A method for administering an active agent to the interior of a bird egg through the shell thereof, comprising the steps of:

(a) providing an injection apparatus comprising:

a blocking member having an outer surface and an inner surface formed thereon;

an elongate hollow rigid shaft having a lumen formed therethrough and having a distal end, an intermediate portion, and a proximal end, with said proximal end extending through said blocking member;

a septum transversely positioned within, and slidably related to, said hollow rigid shaft, said septum positioned within said intermediate portion of said hollow rigid shaft to divide said shaft into proximal and distal compartments;

an active agent depot containing an active agent placed within said proximal compartment of said hollow rigid shaft;

seal means connected to said inner surface of said blocking member for sealably bonding said blocking member to the shell of a bird egg with said shaft penetrating through the shell;

a styler, said styler configured in length and shape such that it can be slidably introduced into said hollow rigid shaft to deliver said active agent depot to the interior of the egg; and (b) inserting said elongate rigid shaft of said injection apparatus into the egg so that said elongate rigid shaft extends through the shell and said blocking member is sealably connected to the shell; and (c) inserting said styler into said hollow rigid shaft to deliver said active agent depot to the interior of the egg and said active agent is dispensed thereto.

26. A method according to either claim 24 or 25, further comprising the step of incubating said egg to hatch with said delivery device sealably bonded thereto.

27. A method according to either claim 24 or 25, wherein said egg is selected from the group consisting of chicken, turkey, duck, geese, quail, ostrich, and pheasant eggs.

28. A method according to either claim 24 or 25, wherein said active agent is administered to said egg during about the first halo of in ovo incubation.

29. A method according to either claim 24 or 25, wherein said egg is a chicken egg and said compound is administered to said egg on about day 0 to about day 15 of incubation.

30. A method according to either claim 24 or 25, wherein said egg is a chicken egg and said compound is administered to said egg on about day 0 to about day 11 of incubation.

31. A method according to either claim 24 or 25, wherein said active agent depot is deposited into said egg in the region defined by the albumin.

32. A method according to either claim 24 or 25, wherein said active agent depot contains an active agent selected from the group consisting of antibiotics, vitamins, vaccines, hormones, enzyme inhibitors, peptides, cells and DNA.

* * * * *